United States Patent
Okamoto et al.

(10) Patent No.: US 12,071,295 B2
(45) Date of Patent: Aug. 27, 2024

(54) LAMINATE, BLISTER PACK, PRESS-THROUGH PACKAGE, AND LAMINATE MANUFACTURING METHOD

(71) Applicant: FUJIMORI KOGYO CO., LTD., Tokyo (JP)

(72) Inventors: Hajime Okamoto, Tokyo (JP); Toyoaki Suzuki, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 0 days.

(21) Appl. No.: 17/541,259

(22) Filed: Dec. 3, 2021

(65) Prior Publication Data
US 2022/0089351 A1 Mar. 24, 2022

Related U.S. Application Data

(63) Continuation of application No. 16/478,209, filed as application No. PCT/IB2018/000005 on Jan. 15, 2018, now Pat. No. 11,220,390.

(30) Foreign Application Priority Data

Jan. 24, 2017 (JP) .................................. 2017-010664

(51) Int. Cl.
*B32B 1/00* (2024.01)
*B32B 27/30* (2006.01)
(Continued)

(52) U.S. Cl.
CPC ................ *B65D 81/24* (2013.01); *B32B 1/00* (2013.01); *B32B 27/30* (2013.01); *B32B 27/32* (2013.01);
(Continued)

(58) Field of Classification Search
CPC ........ B65D 81/24; B65D 65/40; B65D 75/36; B32B 1/02; B32B 27/30; B32B 27/32;
(Continued)

(56) References Cited

U.S. PATENT DOCUMENTS

| | | | |
|---|---|---|---|
| 4,762,882 | A | 8/1988 | Okano et al. |
| 5,139,878 | A | 8/1992 | Kim et al. |

(Continued)

FOREIGN PATENT DOCUMENTS

| | | |
|---|---|---|
| CN | 101052676 A | 10/2007 |
| EP | 0944474 A1 | 9/1999 |

(Continued)

OTHER PUBLICATIONS

International Search Report in corresponding International Application No. PCT/IB2018/000005, dated May 1, 2018, 5 pgs.

(Continued)

*Primary Examiner* — Ruiyun Zhang
(74) *Attorney, Agent, or Firm* — HAUPTMAN HAM, LLP

(57) ABSTRACT

A laminate has a substrate layer, an intermediate layer, and a fluorine-based resin layer in that order, in which the substrate layer contains any one or more kinds of a polyolefin-based resin, a polyester-based resin or a vinyl-based resin, the intermediate layer contains a polyethylene resin and a modified polyethylene resin, and the intermediate layer has a thickness of 5 μm or more and 50 μm or less.

4 Claims, 1 Drawing Sheet

(51) Int. Cl.
  *B32B 27/32*   (2006.01)
  *B65D 65/40*   (2006.01)
  *B65D 81/24*   (2006.01)
  *B65D 75/36*   (2006.01)
  *C08J 5/18*   (2006.01)

(52) U.S. Cl.
  CPC .......... *B65D 65/40* (2013.01); *B32B 2439/70* (2013.01); *B32B 2439/80* (2013.01); *B65D 75/36* (2013.01); *C08J 5/18* (2013.01)

(58) Field of Classification Search
  CPC .............. B32B 27/322; B32B 2439/70; B32B 2439/80
  USPC .... 428/35.7, 421, 422, 518, 520, 34.6, 35.9; 525/88
  See application file for complete search history.

(56) References Cited

U.S. PATENT DOCUMENTS

| | | | |
|---|---|---|---|
| 5,945,221 | A | 8/1999 | Tsai et al. |
| 2003/0008152 | A1 | 1/2003 | Tsai et al. |
| 2003/0203141 | A1 | 10/2003 | Blum et al. |
| 2004/0197567 | A1 | 10/2004 | Tsai et al. |
| 2005/0159549 | A1 | 7/2005 | Kendig et al. |
| 2006/0014022 | A1 | 1/2006 | Kendig et al. |
| 2007/0042147 | A1 | 2/2007 | Altman et al. |
| 2015/0125676 | A1 | 5/2015 | Mizutani |

FOREIGN PATENT DOCUMENTS

| | | | |
|---|---|---|---|
| EP | 1776417 | A1 | 4/2007 |
| JP | S61183371 | A | 8/1986 |
| JP | S62-10107 | A | 1/1987 |
| JP | H6-504742 | A | 6/1994 |
| JP | 2744132 | B2 | 4/1998 |
| JP | 2000015754 | A | 1/2000 |
| JP | 2000505745 | A | 5/2000 |
| JP | 2004-501799 | A | 1/2004 |
| JP | 2005523188 | A | 8/2005 |
| JP | 2008507597 | A | 3/2008 |
| JP | 2009504524 | A | 2/2009 |
| JP | 2012117068 | A | 6/2012 |
| JP | 2012135980 | A | 7/2012 |
| JP | 2014028508 | A | 2/2014 |
| JP | 2015-123351 | A | 7/2015 |
| KR | 100543576 | B1 | 1/2006 |

OTHER PUBLICATIONS

International Preliminary Report on Patentability in corresponding International Application No. PCT/IB2018/000005, dated Jul. 30, 2019, 11 pgs.
Office Action in corresponding Singapore Patent Application No. 11201906260Q dated May 19, 2020; 6 pgs.
Office Action in corresponding Japanese Patent Application No. 2017-010664 dated Jun. 30, 2020; 6 pgs.
Office Action in corresponding Chinese Patent Application No. 201880005783.9 dated Jul. 30, 2020; 13 pgs.
Extended European Search Report in corresponding European Patent Application No. 18744869.1 dated Sep. 11, 2020.
Office Action in corresponding Korean Patent Application No. 10-2019-7019041 dated Dec. 16, 2020, 10 pgs.
Office Action in corresponding Indian Patent Application No. 201917028284 dated Jan. 29, 2021, 6 pgs.
Office Action in corresponding Japanese Patent Application No. 2017-010664 dated Feb. 2, 2021, 6 pgs.
Office Action in corresponding Chinese Patent Application No. 201880005783.9 dated Mar. 8, 2021, 13 pgs.
Office Action in corresponding Korean Patent Application No. 10-2019-7019041 dated Jun. 14, 2021; 10 pgs.
Notice of Allowance in corresponding Japanese Patent Application No. 2017-010664 dated Aug. 10, 2021; 5 pgs.
Notice of Allowance in corresponding Korean Patent Application No. 10-2019-7019041, dated Apr. 12, 2022; 4 pgs.
Notice of Allowance in Corresponding Singapore Patent Application No. 11201906260Q dated Aug. 5, 2022; 5 pgs.
Office Action in Corresponding Japanese Patent Application No. 2021-162897 dated Aug. 9, 2022; 6 pgs.
Notice of Allowance in Corresponding European Patent Application No. 18 744 869.1, dated Jan. 11, 2023; 5 pgs.
Office Action in Corresponding Japanese Patent Application No. 2021-162897, dated Feb. 7, 2023; 6 pgs.
Office Action in Corresponding Canadian Patent Application No. 3,050,081, dated Apr. 4, 2024; 4 pgs.

LAMINATE, BLISTER PACK, PRESS-THROUGH PACKAGE, AND LAMINATE MANUFACTURING METHOD

CROSS REFERENCE TO RELATED APPLICATION

This Application is a continuation of U.S. application Ser. No. 16/478,209 filed on Jul. 16, 2019, which is the National Phase of PCT/IB2018/000005 filed on Jan. 15, 2018, which, in turn, claimed the priority of Japanese Patent Application No. 2017-010664 which was filed on Jan. 24, 2017, the contents of which applications are incorporated herein by reference.

TECHNICAL FIELD

The present invention relates to a laminate, a blister container, a press-through package, and a method for manufacturing the laminate.

BACKGROUND TECHNOLOGY

A film laminate having a high barrier property is used in packaging materials for foods, medicaments, and the like. In the field of medicament, for individual packaging of tablets or capsules, a press-through package (hereinafter may be referred to as "PTP") is used. For suppressing deterioration in contents, a barrier property to water vapor is required for a resin film that is a material for forming PTP. Generally, PTP is manufactured by deep drawing, so that good formability is required for a resin film that is a material for forming PTP. For example, Patent Documents 1 and 2 describe a laminate in which fluorine-based resin films are laminated in order to improve the barrier property to water vapor.

DOCUMENTS OF RELATED ART

Patent Documents

Patent Document 1: Japanese Unexamined Patent Application, First Publication No. 2014-028508
Patent Document 2: Japanese Unexamined Patent Application, First Publication No. 2012-135980

SUMMARY OF THE INVENTION

Problem to be Solved by the Invention

The inventors have intensively studied in order to manufacture a laminate having a high barrier property to water vapor with use of a fluorine-based resin having a high barrier property. As a result, it has been found that a laminate including a fluorine-based resin film has a high barrier property to water vapor, but a fluorine-based resin layer, when being laminated, has a problem that adhesiveness thereof to other layers is poor, and the fluorine-based resin layer is easily peeled at the interface when it is multilayered.

The present invention has been made in view of the above-mentioned circumstances, and an object of the present invention is to provide a laminate having no peeling when laminated, having low water vapor permeability, and having good formability, a blister container and a press-through package including the laminate, as well as a method for manufacturing the laminate.

Means for Solving the Problem

That is, the present invention has adopted the following constituents.

[1] A laminate comprising a substrate layer, an intermediate layer, and a fluorine-based resin layer in that order, wherein the substrate layer contains any one or more kinds of a polyolefin-based resin, a polyester-based resin or a vinyl-based resin, the intermediate layer contains a polyethylene resin and a modified polyethylene resin, and the intermediate layer has a thickness of 5 µm or more and 50 µm or less.

[2] The laminate according to [1], further comprising a second intermediate layer and a second substrate layer in that order on a surface opposite to a surface on which the intermediate layer of the fluorine-based resin layer is formed.

[3] The laminate according to [1] or [2], wherein the fluorine-based resin layer contains polychlorotrifluoroethylene.

[4] The laminate according to any one of [1] to [3], wherein the polyethylene resin contained in the intermediate layer is a linear low density polyethylene.

[5] The laminate according to any one of [1] to [4], wherein the intermediate layer has a thickness of 10 µm or more and 30 µm or less.

[6] The laminate according to any one of [1] to [5], wherein the modified polyethylene resin contained in the intermediate layer is a maleic anhydride-modified polyethylene.

[7] The laminate according to any one of [2] to [6], wherein a thickness of the second substrate layer relative to a thickness of the substrate layer is 0.5 times to 1.1 times.

[8] The laminate according to any one of [2] to [7], wherein a thickness of the second intermediate layer relative to a thickness of the intermediate layer is 0.9 times to 1.1 times.

[9] The laminate according to any one of [1] to [8], wherein the laminate has a water vapor permeability of 0.5 $g/m^2/24$ hours or less.

[10] A blister container comprising the laminate according to any one of [1] to [9].

[11] A press-through package comprising the laminate according to any one of [1] to [9].

[12] A method for manufacturing the laminate according to [1], the method comprising a step of simultaneously melt extrusion-molding a resin to be a raw material of the substrate layer, a resin to be a raw material of the intermediate layer, and a resin to be a raw material of the fluorine-based resin layer.

[13] A method for manufacturing the laminate according to [2], the method comprising a step of simultaneously melt extrusion-molding a resin to be a raw material of the substrate layer, a resin to be a raw material of the intermediate layer, a resin to be a raw material of the fluorine-based resin layer, a resin to be a raw material of the second intermediate layer, and a resin to be a raw material of the second substrate layer.

[14] The method for manufacturing the laminate according to [12] or [13], wherein the fluorine-based resin layer contains polychlorotrifluoroethylene.

[15] The method for manufacturing the laminate according to [12] or [13], wherein the polyethylene resin contained in the intermediate layer is a linear low density polyethylene.

Effects of Invention

The present invention can provide a laminate having no peeling when laminated, having low water vapor permeability, and having good formability, a blister container and a press-through package including the laminate, as well as a method for manufacturing the laminate.

BEST MODE FOR CARRYING OUT THE INVENTION

The present invention will be described below based on preferred embodiments.
<Laminate>

First Embodiment

A first embodiment of the laminate of the present invention will be described with reference to FIG. 1.

Figure 1:
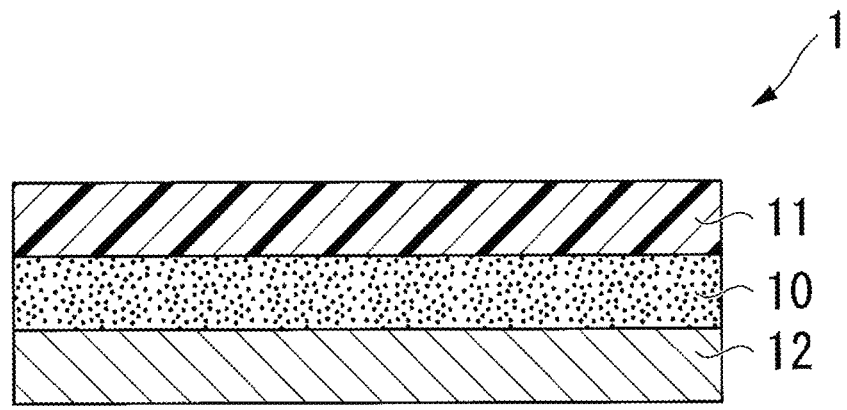
FIG. 1 is a schematic cross-sectional view of a laminate according to a first embodiment of the present invention.

In a laminate 1 of the present embodiment shown in FIG. 1, a substrate layer 12, an intermediate layer 10, and a fluorine-based resin layer 11 are laminated in that order. The intermediate layer 10 functions as an adhesive agent layer, and the substrate layer 12 and the fluorine-based resin layer 11 are laminated with the intermediate layer 10 interposed therebetween.

The laminate 1 of the present embodiment has a three-layer structure of the substrate layer 12, the intermediate layer 10, and the fluorine-based resin layer 11. The laminate having a three-layer structure can be manufactured without undergoing complicated steps, and the uniformity of each layer of the laminate is more improved, so that this is preferable.

Each layer constituting the present invention will be described below.
[Substrate Layer]

In the present embodiment, a material forming the substrate layer 12 is any one or more kinds of a polyolefin-based resin, a polyester-based resin, and a vinyl-based resin.

Examples of the polyolefin-based resin include a polyethylene resin, a polypropylene resin, a polymethylpentene resin, and the like.

Examples of the polyester-based resin include polyethylene terephthalate, polyethylene naphthalate, polyethylene isophthalate, polybutylene terephthalate, and the like.

Examples of the vinyl-based resin include a polyvinyl acetate-based resin, a polyvinyl chloride-based resin, and the like.

In the present embodiment, a polyester-based resin is preferable, and polyethylene terephthalate is more preferable.

In the present embodiment, by using the above-mentioned any one or more kinds of resins in the substrate layer 12, for example, formability during forming in deep drawing is good.

In the present embodiment, a thickness of the substrate layer 12 is not particularly limited. As an example, a lower limit value includes 50 µm or more, 80 µm or more, and 100 µm or more. Additionally, an upper limit value includes 250 µm or less, 220 µm or less, and 200 µm or less.

The above-mentioned upper limit value and lower limit value can be arbitrarily combined.
[Intermediate Layer]

In the present embodiment, the intermediate layer contains a polyethylene resin and a modified polyethylene resin.

Examples of the polyethylene resin include linear low density polyethylene (LLDPE), low density polyethylene (LDPE), medium density polyethylene (MDPE), and high density polyethylene (HDPE), and linear low density polyethylene is preferable.

The modified polyethylene resin is a polyethylene resin modified with unsaturated carboxylic acid or a derivative thereof, and has an acid functional group such as a carboxyl group or a carboxylic anhydride group in the polyethylene resin. In the present embodiment, a polyethylene resin obtained by being subjected to acid modification is preferable.

Examples of the acid modification method include graft modification of melt-kneading a polyethylene resin and an acid functional group-containing monomer in the presence of a radical polymerization initiator such as an organic peroxide or an aliphatic azo compound.

A polyethylene resin material before modification is not limited as long as it contains ethylene as a raw material monomer, and a known polyethylene resin is appropriately used. Specific examples of the polyethylene resin include, in addition to the above-mentioned resins, ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer; ethylene-based copolymer resins such as an ethylene-vinyl acetate copolymer, an ethylene-(meth)acrylic acid copolymer, and an ethylene-(meth)acrylic acid ester copolymer.

The acid functional group-containing monomer is a compound having an ethylenic double bond and a carboxyl group or a carboxylic anhydride group in the same molecule, and examples thereof include various unsaturated monocarboxylic acids, dicarboxylic acids, and acid anhydrides of dicarboxylic acids.

Examples of the acid functional group-containing monomer having a carboxyl group (carboxyl group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

As these acid functional group-containing monomers, one kind may be used alone or two or more kinds may be used concurrently in a component constituting the intermediate layer.

Among these, as the acid functional group-containing monomer, an acid functional group-containing monomer having an acid anhydride group is preferable, a carboxylic anhydride group-containing monomer is more preferable, and maleic anhydride is particularly preferable.

When the acid functional group-containing monomer used in acid modification is partially unreacted, it is preferable to remove an unreacted acid functional group-containing monomer in advance in order to prevent reduction in an adhesion force due to the unreacted acid functional group-containing monomer.

In the present embodiment, the modified polyethylene resin is preferably a maleic anhydride-modified polyethylene.

In the present embodiment, when a total mass of the polyethylene resin and the modified polyethylene resin is set to 100%, a lower limit value of a ratio of the polyethylene resin to the total mass of the polyethylene resin and the modified polyethylene resin is preferably 10% or more, and further preferably 20% or more. Furthermore, an upper limit value of the ratio of the polyethylene resin to the total mass of the polyethylene resin and the modified polyethylene resin is preferably 70% or less, and further preferably 60% or less. For example, a mixing ratio of the polyethylene resin and the modified polyethylene resin can be [polyethylene resin]:[modified polyethylene resin]=20:80 to 60:40.

In the present embodiment, by using a mixed material of the polyethylene resin and the modified polyethylene resin for the intermediate layer, the adhesiveness between the fluorine-based resin layer and the substrate layer can be improved. For this reason, a laminate that hardly causes interlayer peeling can be provided.

In the present embodiment, a thickness of the intermediate layer is 5 μm or more and 50 μm or less, and preferably 10 μm or more and 30 μm or less.

In the present embodiment, by setting the thickness of the intermediate layer to not less than the above-mentioned lower limit value, the adhesiveness can be improved and the interlayer peeling can be prevented. Furthermore, by setting the thickness of the intermediate layer to not more than the above-mentioned upper limit value, deterioration in formability due to an increase in film thickness can be prevented.

[Fluorine-Based Resin Layer]

As a fluorine-based resin material used in the fluorine-based resin layer, polytetrafluoroethylene (PTFE), a tetrafluoroethylene-perfluoroalkyl vinyl ether copolymer (PFA), a tetrafluoroethylene-hexafluoropropylene copolymer (FEP), tetrafluoroethylene-hexafluoropropylene-perfluoroalkyl vinyl ether (EPA), a tetrafluoroethylene-ethylene copolymer (ETFE), polyvinylidene fluoride (PVDF), polychlorotrifluoroethylene (PCTFE), a chlorotrifluoroethylene-ethylene copolymer (ECTFE), a mixture of one or two or more kinds of these, and the like can be used, and polychlorotrifluoroethylene (PCTFE) is preferable.

In the present embodiment, a thickness of the fluorine-based resin layer is not particularly limited. As an example, a lower limit value is preferably 5 μm or more, and more preferably 10 μm or more. Furthermore, an upper limit value is preferably 300 μm or less, more preferably 200 μm or less, further preferably 50 μm or less, and most preferably 45 μm or less.

The above-mentioned upper limit value and lower limit value can be arbitrarily combined.

In the present embodiment, by setting the thickness of the fluorine-based resin layer to not less than the above-mentioned lower limit value, the water vapor permeability of the laminate can be reduced, and for example, when the laminate is used in a press-through package for medicaments, high dampproofness can be exerted, and deterioration in contents due to water vapor can be prevented.

In the present embodiment, by setting the thickness of the fluorine-based resin layer to not more than the above-mentioned upper limit value, production cost can be reduced.

Second Embodiment

A second embodiment of the laminate of the present invention will be described with reference to FIG. 2.

Figure 2:
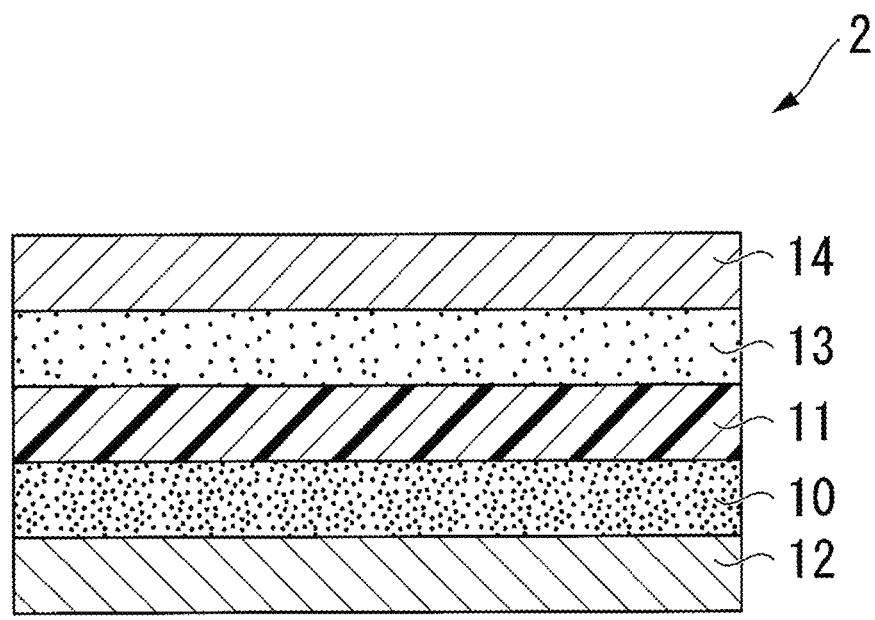
FIG. 2 is a schematic cross-sectional view of a laminate according to a second embodiment of the present invention.

In a laminate 1 of the present embodiment shown in FIG. 2, a substrate layer 12, an intermediate layer 10, a fluorine-based resin layer 11, a second intermediate layer 13, and a second substrate layer 14 are laminated in that order.

A laminate having a five-layer configuration is preferable due to increase in strength of the laminate. Furthermore, the laminate having a five-layer configuration becomes symmetric on both sides of the lamination configuration, so that curling hardly generates, and this is preferable.

Each material constituting the substrate layer, the intermediate layer, and the fluorine-based resin layer in the present embodiment is similar to each material described in the above-mentioned first embodiment.

In the present embodiment, a material constituting the substrate layer and a material constituting the second substrate layer may be the same or different, and it is preferable that both substrate layers contains the same resin material.

The thickness of the second substrate layer relative to that of the substrate layer is preferably 0.5 times to 1.1 times, more preferably 0.9 times to 1.1 times, and particularly preferably 0.95 times to 1.05 times.

In the present embodiment, a material constituting the intermediate layer and a material constituting the second intermediate layer may be the same or different, and it is preferable that both intermediate layers contains the same resin material.

The thickness of the second intermediate layer relative to that of the intermediate layer is preferably 0.9 times to 1.1 times, and more preferably 0.95 times to 1.05 times.

In the above-mentioned laminate of the present embodiment, a total film thickness is preferably 300 μm or less, and more preferably 290 μm or less, in any embodiment.

Furthermore, the laminate of the present embodiment preferably has a water vapor permeability of 0.5 $g/m^2/24$ hours or less, more preferably 0.4 $g/m^2/24$ hours or less, and particularly preferably 0.3 $g/m^2/24$ hours or less.

<Blister Container, Press-Through Package>

The blister container and press-through package of the present embodiment are manufactured by deep-drawing the above-mentioned laminate of the first or second embodiment of the present invention.

When the above-mentioned laminate 1 of the first embodiment of the present invention is used, forming is performed so that the fluorine-based resin layer 11 is on an outer side.

The press-through package of the present embodiment is used, for example, in individual packaging of tablets or capsules. Since the above-mentioned laminate of the present invention has low water vapor permeability, deterioration in contents of tablets, capsules or the like can be prevented.

<Method for Manufacturing Laminate>

It is preferable that the laminate of the present invention is manufactured by simultaneously melt extrusion-molding a resin to be a raw material of the above-mentioned substrate layer, a resin to be a raw material of the above-mentioned intermediate layer, and a resin to be a raw material of the above-mentioned fluorine-based resin layer.

Additionally, it is preferable that the laminate of the second embodiment is manufactured by simultaneously melt extrusion-molding a resin to be a raw material of the above-mentioned substrate layer, a resin to be a raw material of the above-mentioned intermediate layer, a resin to be a raw material of the above-mentioned fluorine-based resin layer, a resin to be a raw material of the above-mentioned second intermediate layer, and a resin to be a raw material of the above-mentioned second substrate layer.

Examples

The present invention will be described in further detail below by way of Examples, but the present invention is not limited by these examples.

<Manufacturing of Laminate Having Three-Layer Configuration>

Examples 1 to 8, Comparative Examples 1 and 2

A laminate having a three-layer configuration with a substrate layer, an intermediate layer, and a fluorine-based resin layer in that order was manufactured. Resins to be raw materials of respective layers shown in Table 1 were each separately heat-melted. The resulting mixture was subjected to multilayer film formation with use of an extruder capable of performing coextrusion multilayer molding, to obtain a laminate having a three-layer configuration with a substrate layer, an intermediate layer, and a fluorine-based resin layer in that order.

TABLE 1

| | Substrate layer | Intermediate layer | Fluorine-based resin layer | Total film thickness (μm) |
|---|---|---|---|---|
| Example 1 | PET [200 μm] | Intermediate layer 1 [30 μm] | PCTFE [40 μm] | 270 |
| Example 2 | PET [200 μm] | Intermediate layer 2 [30 μm] | PCTFE [40 μm] | 270 |
| Example 3 | PET [200 μm] | Intermediate layer 3 [30 μm] | PCTFE [40 μm] | 270 |
| Example 4 | PET [200 μm] | Intermediate layer 4 [30 μm] | PCTFE [40 μm] | 270 |
| Example 5 | PET [200 μm] | Intermediate layer 5 [30 μm] | PCTFE [40 μm] | 270 |
| Example 6 | PET [165 μm] | Intermediate layer 1 [30 μm] | PCTFE [75 μm] | 270 |
| Example 7 | PET [130 μm] | Intermediate layer 1 [30 μm] | PCTFE [110 μm] | 270 |
| Example 8 | PET [90 μm] | Intermediate layer 1 [30 μm] | PCTFE [150 μm] | 270 |
| Comparative Example 1 | PET [200 μm] | Intermediate layer 6 [30 μm] | PCTFE [40 μm] | 270 |
| Comparative Example 2 | PET [200 μm] | Intermediate layer 7 [30 μm] | PCTFE [40 μm] | 270 |

In Table 1, respective symbols mean the following materials. The numerical value in the parenthesis is the thickness of each layer.
  PET: Polyethylene terephthalate resin. NOVAPEXI4 manufactured by Mitsubishi Chemical Corporation was used.
  PCTFE: Polychlorotrifluoroethylene resin. DF0050-C1 manufactured by DAIKIN INDUSTRIES, LTD. was used.
  Intermediate layers 1 to 7: Intermediate layers 1 to 7 shown in the following Table 2. The ratio of each material in Table 2 is a ratio by mass %.

TABLE 2

| | |
|---|---|
| Intermediate layer 1 | Linear low density polyethylene (LLDPE)/maleic anhydride-modified polyethylene (ADMER) = 20/80 |
| Intermediate layer 2 | Linear low density polyethylene (LLDPE)/maleic anhydride-modified polyethylene (ADMER) = 50/50 |
| Intermediate layer 3 | Linear low density polyethylene (LLDPE)/maleic anhydride-modified polyethylene (ADMER) = 60/40 |
| Intermediate layer 4 | Linear low density polyethylene (LLDPE)/maleic anhydride-modified polyethylene (ADMER) = 70/30 |
| Intermediate layer 5 | Linear low density polyethylene (LLDPE)/maleic anhydride-modified polyethylene (ADMER) = 80/20 |
| Intermediate layer 6 | Linear low density polyethylene (LLDPE) |
| Intermediate layer 7 | Maleic acid-modified polyethylene |

Evaluation

Regarding each of the laminates of Examples 1 to 8 and Comparative Examples 1 and 2, the following test was performed.

[Water Vapor Permeability Measurement]

Regarding the laminates obtained according to the above-mentioned <Manufacturing of Laminate Having Three-Layer Configuration>, measurement was performed under conditions of a cell temperature of 40° C. and a relative humidity difference of 90% RH using a water vapor permeability meter (manufactured by Systech Instruments, product name "L80-5000"), in accordance with JIS K7129: 2008 (A method). The water vapor permeability is expressed by the number of grams of water vapor, which has permeated in 24 hours, per area of 1 m$^2$ [g/m$^2$/24 h].

[Interlayer Peeling Test]

Regarding the laminates obtained according to the above-mentioned <Manufacturing of Laminate Having Three-Layer Configuration>, interlayer peeling of each laminate was visually observed. Each laminate was subjected to deep drawing, and the presence or absence of interlayer peeling of each layer after forming was visually observed, and evaluated based on the following criteria.

⊚; Both before deep drawing and after deep drawing, interlayer peeling was not observed at the interface between the intermediate layer and the fluorine-based resin layer and at the interface between the substrate layer and the intermediate layer, so that the result was good.

◯; Interlayer peeling was not observed before deep drawing, and interlayer peeling was hardly observed at the interface between the intermediate layer and the fluorine-based resin layer and at the interface between the substrate layer and the intermediate layer also after deep drawing.

Δ; Interlayer peeling was not observed before deep drawing, but interlayer peeling was observed at the interface between the intermediate layer and the fluorine-based resin layer or at the interface between the substrate layer and the intermediate layer after deep drawing.

x; Both before deep drawing and after deep drawing, interlayer peeling was observed at the interface between the intermediate layer and the fluorine-based resin layer or at the interface between the substrate layer and the intermediate layer.

[Formability]

The laminate formability was evaluated based on the following criteria by visually observing the presence or absence of forming defective when a press-through package was formed.

⊚: Uneven thickness of the deep drawn portion and retainability of the shape after deep drawing were very good.

◯: Uneven thickness of the deep drawn portion and retainability of the shape after deep drawing were generally good.

Δ: The deep drawn portion was slightly uneven in the thickness, or the shape after deep drawing could not be retained in some packages.

x: The deep drawn portion was uneven in the thickness, or the shape of the deep drawn portion could not be retained after deep drawing.

[Deterioration in Contents]

A press-through package was manufactured using each of the laminates of Examples 1 to 8 and Comparative Examples 1 and 2, a medicine (having deliquescency) for testing contents was placed into the package, and deterioration in contents was evaluated based on the following criteria. At this time, the press-through package was manufactured so that the fluorine-based resin layer of the laminate became an outer side.

◯: Deterioration in contents was not observed.

Δ: Deterioration in contents was slightly observed.

x: It was confirmed that contents had been remarkably deteriorated.

TABLE 3

|  | Water vapor permeability [g/m²/24 h] | Interlayer peeling | Formability | Deterioration in contents |
|---|---|---|---|---|
| Example 1 | 0.15 | ⊚ | ◯ | ◯ |
| Example 2 | 0.15 | ⊚ | ◯ | ◯ |
| Example 3 | 0.15 | ◯ | ◯ | ◯ |
| Example 4 | 0.15 | ◯ | ◯ | ◯ |
| Example 5 | 0.15 | ◯ | ◯ | ◯ |
| Example 6 | 0.08 | ⊚ | ◯ | ◯ |
| Example 7 | 0.05 | ⊚ | ◯ | ◯ |
| Example 8 | 0.04 | ⊚ | ◯ | ◯ |

TABLE 3-continued

|  | Water vapor permeability [g/m²/24 h] | Interlayer peeling | Formability | Deterioration in contents |
|---|---|---|---|---|
| Comparative Example 1 | 0.15 | X | X | X |
| Comparative Example 2 | 0.15 | X | X | X |

As shown in the above-mentioned results, the laminates of Examples 1 to 8 to which the present invention had been applied had a low water vapor permeability and hardly generated interlayer peeling. Furthermore, the formability was also excellent and deterioration in contents could also be prevented. Regarding the laminates of Comparative Examples 1 and 2, the water vapor permeability was equivalent to those in Examples, but deterioration was observed in contents due to failure in adhesiveness between the substrate layer and the intermediate layer or between the intermediate layer and the fluorine-based resin layer.

<Manufacturing of Laminate Having Five-Layer Configuration>

Examples 9 to 24, Comparative Examples 3 and 4

A laminate having a five-layer configuration with a substrate layer, an intermediate layer, a fluorine-based resin layer, a second intermediate layer, and a second substrate layer in that order was manufactured. Resins to be raw materials of respective layers shown in Table 4 were each separately heat-melted. The resulting mixture was subjected to multilayer film formation with use of an extruder capable of performing coextrusion multilayer molding, to obtain a laminate having a five-layer configuration with a substrate layer, an intermediate layer, a fluorine-based resin layer, a second intermediate layer, and a second substrate layer in that order.

Comparative Examples 5, 6

Comparative Example 5: A polyethylene terephthalate film (film thickness: 200 μm) was used.

Comparative Examples 6: A polychlorotrifluoroethylene film (film thickness: 200 μm) was used.

TABLE 4

|  | Substrate layer | Intermediate layer | Fluorine-based resin layer | Second intermediate layer | Second substrate layer | Total film thickness (μm) |
|---|---|---|---|---|---|---|
| Example 9 | PET [100 μm] | Intermediate layer 1 [15 μm] | PCTFE [40 μm] | Intermediate layer 1 [15 μm] | PET [100 μm] | 270 |
| Example 10 | PET [100 μm] | Intermediate layer 2 [15 μm] | PCTFE [40 μm] | Intermediate layer 2 [15 μm] | PET [100 μm] | 270 |
| Example 11 | PET [100 μm] | Intermediate layer 3 [15 μm] | PCTFE [40 μm] | Intermediate layer 3 [15 μm] | PET [100 μm] | 270 |
| Example 12 | PET [100 μm] | Intermediate layer 4 [15 μm] | PCTFE [40 μm] | Intermediate layer 4 [15 μm] | PET [100 μm] | 270 |
| Example 13 | PET [100 μm] | Intermediate layer 5 [15 μm] | PCTFE [40 μm] | Intermediate layer 5 [15 μm] | PET [100 μm] | 270 |
| Comparative Example 3 | PET [100 μm] | Intermediate layer 6 [15 μm] | PCTFE [40 μm] | Intermediate layer 6 [15 μm] | PET [100 μm] | 270 |
| Comparative Example 4 | PET [100 μm] | Intermediate layer 7 [15 μm] | PCTFE [40 μm] | Intermediate layer 7 [15 μm] | PET [100 μm] | 270 |

TABLE 5

| | Substrate layer | Intermediate layer | Fluorine-based resin layer | Second intermediate layer | Second substrate layer | Total film thickness (μm) |
|---|---|---|---|---|---|---|
| Example 14 | PET [82 μm] | Intermediate layer 1 [15 μm] | PCTFE [75 μm] | Intermediate layer 1 [15 μm] | PET [82 μm] | 269 |
| Example 15 | PET [65 μm] | Intermediate layer 1 [15 μm] | PCTFE [110 μm] | Intermediate layer 1 [15 μm] | PET [65 μm] | 270 |
| Example 16 | PET [45 μm] | Intermediate layer 1 [15 μm] | PCTFE [150 μm] | Intermediate layer 1 [15 μm] | PET [45 μm] | 270 |
| Example 17 | PP [100 μm] | Intermediate layer 1 [15 μm] | PCTFE [40 μm] | Intermediate layer 1 [15 μm] | PP [100 μm] | 270 |
| Example 18 | PVC [100 μm] | Intermediate layer 1 [15 μm] | PCTFE [40 μm] | Intermediate layer 1 [15 μm] | PVC [100 μm] | 270 |
| Example 19 | PET [105 μm] | Intermediate layer 1 [15 μm] | PCTFE [30 μm] | Intermediate layer 1 [15 μm] | PET [105 μm] | 270 |
| Example 20 | PET [110 μm] | Intermediate layer 1 [15 μm] | PCTFE [20 μm] | Intermediate layer 1 [15 μm] | PET [110 μm] | 270 |
| Example 21 | PET [115 μm] | Intermediate layer 1 [15 μm] | PCTFE [10 μm] | Intermediate layer 1 [15 μm] | PET [115 μm] | 270 |
| Example 22 | PET [117 μm] | Intermediate layer1 [15 μm] | PCTFE [5 μm] | Intermediate layer 1 [15 μm] | PET [117 μm] | 269 |
| Example 23 | PET [100 μm] | Intermediate layer 1 [15 μm] | ECTFE [40 μm] | Intermediate layer 1 [15 μm] | PET [100 μm] | 270 |
| Example 24 | PET [100 μm] | Intermediate layer 1 [30 μm] | PCTFE [20 μm] | Intermediate layer 1 [20 μm] | PET [50 μm] | 220 |
| Comparative Example 5 | PET [200 μm] | — | — | — | — | 200 |
| Comparative Example 6 | — | — | PCTFE [200 μm] | — | — | 200 |

In Tables 4 and 5, respective symbols mean the following materials. The numerical value in the parenthesis is the thickness of each layer.
  PET: Polyethylene terephthalate resin. NOVAPEXI4 manufactured by Mitsubishi Chemical Corporation was used.
  PP: Polypropylene resin. PS522M manufactured by SunAllomer Ltd. was used.
  PVC: Polyvinyl chloride resin.
  PCTFE: Polychlorotrifluoroethylene resin. DF0050-C1 manufactured by DAIKIN INDUSTRIES, LTD. was used.
  ECTFE: Chlorotrifluoroethylene-ethylene copolymer.
  Intermediate layers 1 to 7: Intermediate layers 1 to 7 shown in the above-mentioned Table 2.

Evaluation

Regarding each of the laminates of Examples 9 to 24 and Comparative Examples 3 to 6, water vapor permeability, interlayer peeling, formability, and deterioration in contents were evaluated by the same methods as those described above. The results are described in Tables 6 and 7.

TABLE 6

| | Water vapor permeability [g/m²/24 h] | Interlayer peeling | Formability | Deterioration in contents |
|---|---|---|---|---|
| Example 9 | 0.15 | ⊙ | ⊙ | ○ |
| Example 10 | 0.15 | ⊙ | ⊙ | ○ |
| Example 11 | 0.15 | ○ | ⊙ | ○ |
| Example 12 | 0.15 | ○ | ⊙ | ○ |
| Example 13 | 0.15 | ○ | ⊙ | ○ |
| Comparative Example 3 | 0.15 | X | X | X |
| Comparative Example 4 | 0.15 | X | X | X |

TABLE 7

| | Water vapor permeability [g/m²/24 h] | Interlayer peeling | Formability | Deterioration in contents |
|---|---|---|---|---|
| Example 14 | 0.08 | ⊙ | ⊙ | ○ |
| Example 15 | 0.05 | ⊙ | ⊙ | ○ |
| Example 16 | 0.04 | ⊙ | ⊙ | ○ |
| Example 17 | 0.15 | ⊙ | ⊙ | ○ |
| Example 18 | 0.15 | ⊙ | ⊙ | ○ |
| Example 19 | 0.20 | ○ | ○ | ○ |
| Example 20 | 0.30 | ○ | ○ | ○ |
| Example 21 | 0.50 | ○ | ○ | ○ |
| Example 22 | 1.20 | ○ | ○ | △ |
| Example 23 | 0.40 | △ | △ | △ |
| Example 24 | 0.30 | ⊙ | △ | ○ |
| Comparative Example 5 | 20 | — | △ | X |

TABLE 7-continued

| | Water vapor permeability [g/m²/24 h] | Interlayer peeling | Formability | Deterioration in contents |
|---|---|---|---|---|
| Comparative Example 6 | 0.03 | — | X | ○ |

As shown in the above-mentioned results, the laminates of Examples 9 to 24 to which the present invention had been applied had a low water vapor permeability and hardly generated interlayer peeling. Furthermore, the formability was also excellent and deterioration in contents could also be prevented. Regarding the laminates of Comparative Examples 3 to 6, the water vapor permeability was equivalent to those in Examples, but deterioration in contents was observed due to failure in adhesiveness between the substrate layer and the intermediate layer or between the intermediate layer and the fluorine-based resin layer.

What is claimed is:

1. A laminate of a three-layer structure consisting of a substrate layer, an intermediate layer, and a fluorine-based resin layer in that order, wherein
said substrate layer contains polyethylene terephthalate,
said substrate layer has a thickness of 90 μm or more and 200 μm or less,
said intermediate layer consists of a linear low density polyethylene and a maleic anhydride-modified polyethylene,
a mixing ratio of the linear low density polyethylene and the maleic anhydride-modified polyethylene ([linear low density polyethylene]:[maleic anhydride-modified polyethylene]) based on mass is 20:80 to 50:50,
said intermediate layer has a thickness of 10 μm or more and 30 μm or less,
said fluorine-based resin layer consists of polychlorotrifluoroethylene,
said fluorine-based resin layer has a thickness of 40 μm or more and 150 μm or less, and
said laminate has a water vapor permeability of 0.5 g/m²/24 hours or less.

2. A blister container comprising the laminate according to claim 1.

3. A press-through package comprising the laminate according to claim 1.

4. A method for manufacturing the laminate according to claim 1, the method comprising a step of simultaneously melt extrusion-molding a resin to be a raw material of said substrate layer, a resin to be a raw material of said intermediate layer, and a resin to be a raw material of said fluorine-based resin layer.

* * * * *